April 20, 1965 G. A. DALIN 3,179,538
TERMINAL CONNECTION FOR ELECTRIC BATTERIES
Filed Dec. 23, 1960 3 Sheets-Sheet 1

GEORGE ABBE DALIN
INVENTOR.

BY *Irving Holtzman*

ATTORNEY

April 20, 1965  G. A. DALIN  3,179,538
TERMINAL CONNECTION FOR ELECTRIC BATTERIES
Filed Dec. 23, 1960  3 Sheets-Sheet 2

GEORGE ABBE DALIN
INVENTOR.

BY *Irving Holtzman*
ATTORNEY

April 20, 1965  G. A. DALIN  3,179,538
TERMINAL CONNECTION FOR ELECTRIC BATTERIES
Filed Dec. 23, 1960  3 Sheets-Sheet 3

GEORGE ABBE DALIN
INVENTOR.

BY *Irving Holtzman*

ATTORNEY

United States Patent Office 3,179,538
Patented Apr. 20, 1965

3,179,538
TERMINAL CONNECTION FOR ELECTRIC
BATTERIES
George Abbe Dalin, Union, N.J., assignor to Yardney
International Corp., New York, N.Y., a corporation of
New York
Filed Dec. 23, 1960, Ser. No. 78,096
5 Claims. (Cl. 136—134)

This invention relates to electrochemical batteries. More particularly, the invention relates to a terminal arrangement for large electrochemical cells such as those forming part of batteries used for propulsion purposes, e.g. in conjunction with submarines. In such types of cells there are generally employed a multiplicity of plates from which numerous leads extend toward the terminals of the cells. The establishment of the necessary connections is laborious and requires detailed machining.

In addition, with present methods of construction, terminals must be relatively heavy to provide cross-sectional areas large enough to transport necessary current and without generating excessive heat, as well as an adequate surface area to accommodate the connectors leading to plate tabs and intercell bus-bars. There exists, therefore, a need for a terminal arrangement for large cells which is relatively simple to manufacture and which overcomes the disadvantages of the terminals presently in use.

Accordingly, it is a primary object of the invention to provide a terminal assembly for large electrochemical cells whereby extremely heavy currents may be carried.

It is another object of the invention to provide a terminal structure for large electrochemical cells that is relatively light in weight and has improved electrical and thermal conductivity.

It is a further object of the invention to provide a terminal for large electrochemical cells which is simple and easy to manufacture.

It is still another object of the present invention to provide a terminal assembly for a cell adapted for the effective removal of heat generated in said cells.

It is also an object of the present invention to simplify the sealing problem at the points of emergence of pole pieces and cooling-water connections from a cell casing (e.g. at the cover thereof).

The present invention features a terminal assembly comprising a conductive base having a plurality of terminal tabs disposed on the bottom of the base which are adapted to join with tabs of a plurality of plates in a cell.

Other objects, features and advantages of the invention will be apparent by reference to the following description and accompanying drawing in which.

Figure 1:
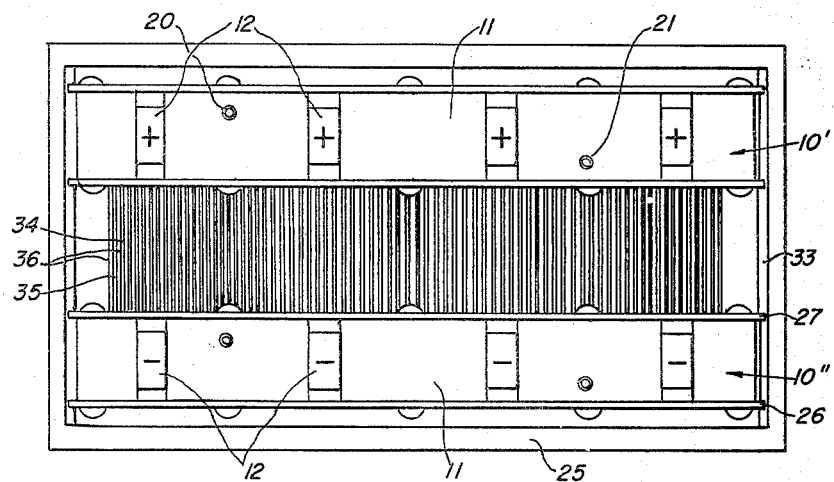
FIG. 1 is a plan view of a cell with the cover removed, showing a pair of terminal assemblies according to the invention incorporated therein.
Figure 2:
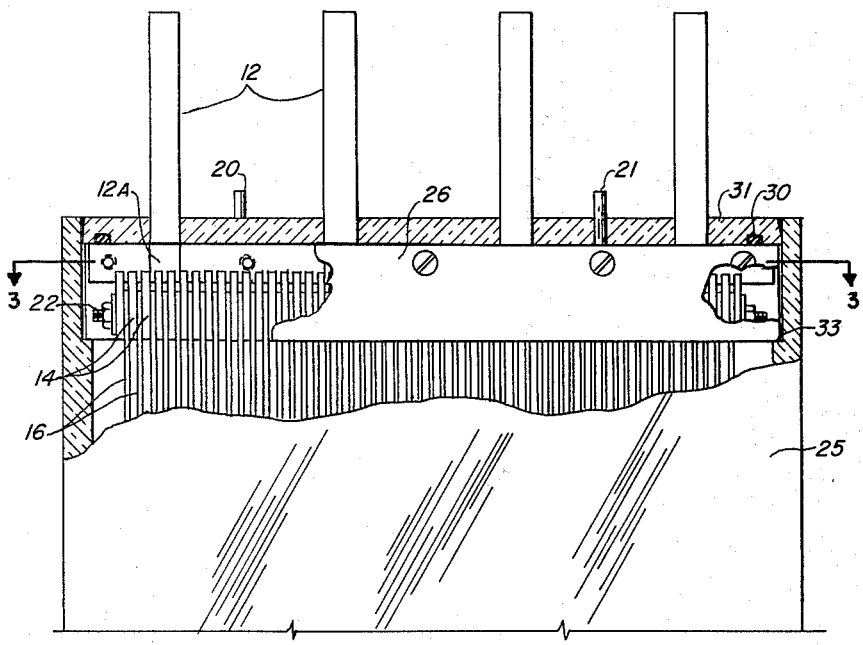
FIG. 2 is a front view of the terminal assembly shown in FIG. 1.

As shown in the drawing, 10', 10" are two terminal assemblies each including a conductive base 11 of rectangular configuration having a plurality of upright pole members 12 attached thereto along its length. Brazed to the lower surface of the base 11 are a multiplicity of terminal tabs 14 extending downwardly therefrom in planes at right angles to the base. Inserted between the terminal tabs 14 are plate tabs 16 rising from either the positive plates 34 (assembly 10') or the negative plates 35 (assembly 10") alternately lodged within a casing 25 to form a cell assembly. Separators 36 are disposed between the positive and negative plates. The separators can be made from permeable or semi-permeable cellulose or other permeable or semi-permeable sheet material. The positive plates 34 may be wrapped in pairs within envelopes of separator material each embracing a negative plate 35, and with other plates 35 interposed between adjacent envelopes, e.g. as shown in U.S. Patent No. 2,899,635, issued August 11, 1959, to Michel N. Yardney. Preferably, the positive active material is silver and the negative material is zinc, yet other positive and/or negative active materials may also be employed.

The base 11 is equipped with a meandering cooling channel 18 connected to an inlet 20 and an outlet 21 rising from the base to permit circulation of coolant through the base so as to remove heat generated within the cells. The terminal tabs 14 and the plate tabs 16 have openings therethrough for the insertion of a connecting bolt 22 so that they may be drawn up tightly, thereby insuring good contact.

Figure 3:
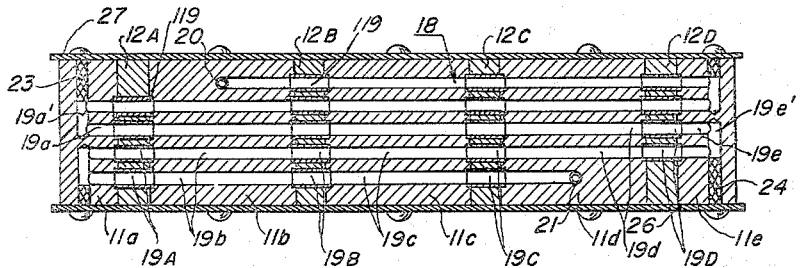
FIG. 3 is a sectional view taken on line 3—3 of FIG. 2.
Figure 4:
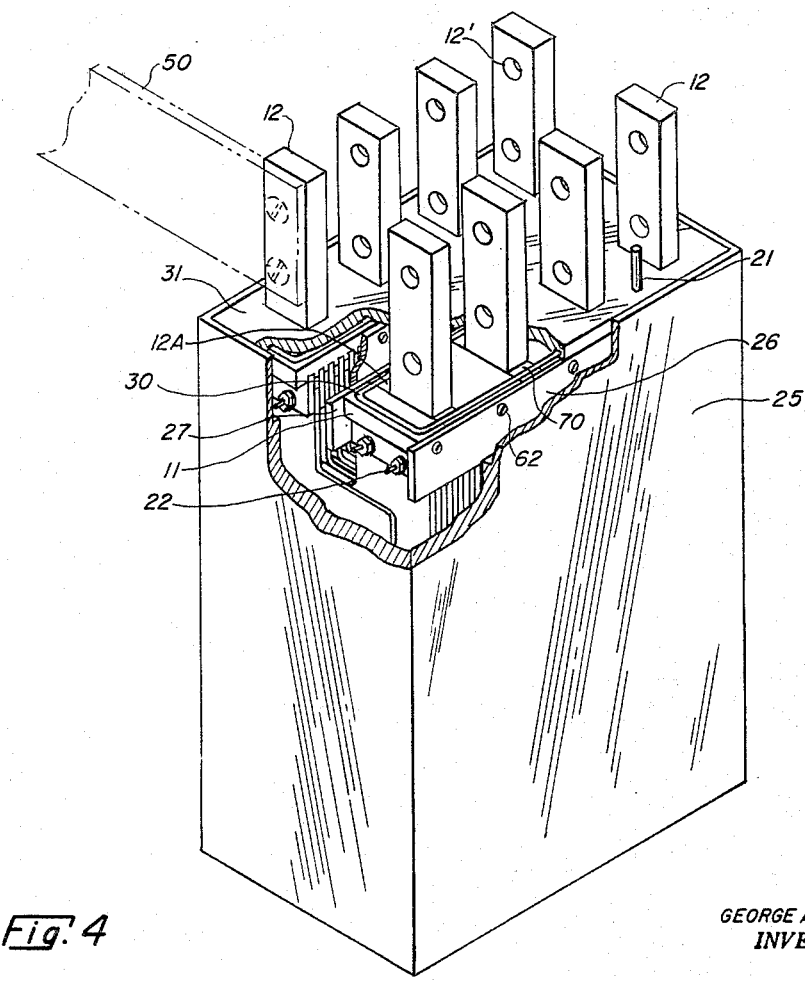
FIG. 4 is a view in perspective of a cell with a terminal assembly as shown in FIGS. 1, 2 and 3.

Generally, a terminal assembly constructed in accordance with the invention is fabricated from standard bar stock, preferably of copper. Drilling long straight holes of small diameter in copper is difficult, because the drill tends to deviate from the desired axis. Because of this, in the preferred form of this invention, the terminals are fabricated from short sections of copper which can easily be drilled and which are subsequently brazed together. Thus, the copper bar stock is cut into short sections 11a to 11e. Sections 11b, 11c and 11d may then readily be drilled with through-going bores 19b, 19c 19d and sections 11a and 11e with blind holes 19a and 19e. As will be seen in FIG. 3, the blind holes 19a and 19e of end sections 11a and 11e are interconnected by transverse bores 19a' and 19e' which are then closed at their outer ends by respective plugs 23 and 24.

The pole members 12 have wider base portions 12A, 12B, 12C, 12D which are co-extensive with the sections 11a to 11e. These base portions 12a to 12d are provided with transverse bores 19A, 19B, 19C, 19D aligned with the bores 19a to 19e for constituting a continuous channel for the passage of a cooling medium. The pole pieces 12 may be shaped from the same bar stock as the sections 11a to 11e by a machining operation which reduces the width of their upstanding extremities relative to that of their base portions 12A to 12D.

The bar stock of which the pole members are fashioned may be of greater or smaller thickness than the stock used for the base 11, depending on requirements established by the currents to be carried. However, the width of the pole-member bar stock is preferably the same as that of the base bar stock to minimize the amount of machining involved.

The bores 19A to 19D, which are wider than the bores 19a to 19e, contain locating tubes 119 which project for a short distance from each face of base portions 12A to 12D into corresponding recesses of sections 11a to 11c to insure correct alignment between the constituents of base 11. Shallow slots are cut in what is to be the lower surface of base 11 to receive the terminal tabs 14.

After cutting the bar stock to size, the width of the individual pole pieces 12 is cut down in the aforedescribed manner, bolt holes 12' are then drilled and the surfaces which are to form part of the bottom of the base 11 are slotted to receive terminal tabs 14. Then all the sections including base-bar portions 11a to 11e, locating tubes 119, pole pieces 12, water connections 21, plugs 23 and 24 for the transverse holes in the water lines, and terminal tabs 14 are assembled with suitable brazing material and brazed, preferably in one operation. If desired, however, brazing may be carried out in two or more stages if the successive operations use brazing materials of progressively decreasing melting point.

After brazing is completed, the face 70 of the pole pieces in conjunction with the top surfaces of the sections 11a, 11b, 11c, 11d and 11e constitute a continuous, planar surface against which an O-ring 30 or other gasket may seat for sealing purposes. The O-ring or gaskets 30 is disposed in a groove of a cover 31 for casing 25 to form a seal between the base 11 and cover 31; the cover has apertures in line with inlet 20 and outlet 21 to facilitate their connection to an external circulation system. In view of this construction the individual pole pieces and water lines need not be sealed to cover 31 to prevent the escape of fluids such as gas or electrolyte since the compartment containing the active materials is effectively sealed off from them by the ring 30.

It will be apparent that the terminal tabs can also be formed integral with the base 11, e.g. by a suitable machining operation on a plate of increased original thickness. However, in view of the difficulty of deep-slotting copper, the brazed-in tabs are preferred.

The terminal assembly is supported on a ledge 33 of the casing 25, representative of any suitable supporting structure therefor, by means of lateral mounting members 26 and 27 fastened to the base 11 of each half by screws or other means. The lateral mounting members 26 and 27, if attached prior to the brazing operation, should be made of steel or other high-melting metal or alloy which is unaffected by brazing, in contradistinction to copper which after brazing is relatively soft and incapable of supporting substantial loads. Alternatively, these supporting members may be joined to the rest of the terminal structure after the brazing operation, as by bolts 62, in which case the choice of materials is less restricted and includes even hardened copper; the latter method has the advantage of avoiding difficulties due to differences in thermal expansion.

A conductor bar 50, shown in dot-dash lines, is representative of a number of such bars which may be bolted or otherwise secured to corresponding pole pieces 12 of a plurality of cells assembled side by side.

For an experimental determination of the advantage provided by this new terminal, two model terminals were constructed, one of the new type and one of a conventional type. At equal currents (2670 amps per pole piece) the voltage drop at the contact surfaces between the terminal tabs and the plate tabs was found to be 1.9 millivolts for the new terminal and 24.5 millivolts for the conventional terminal. In addition, the heat-transfer coefficient for the new terminal, taking into account the contact resistance as well as the resistance of the terminal itself, proved to be 80% greater for the new terminal than for the conventional terminal. This advantage may be attributed to the greater area of contact in the new terminal provided by the many terminal tabs as well as to the absence of multiple contacts in series which are encountered with conventional terminals.

Figure 5:
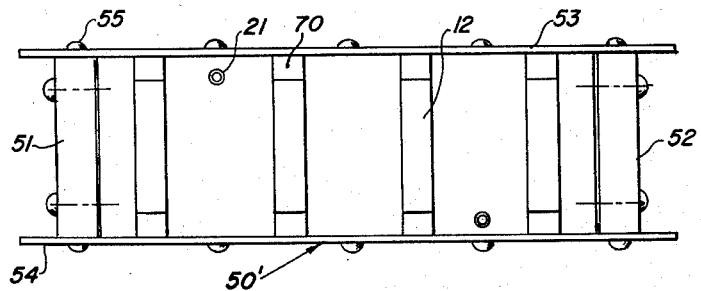
FIG. 5 is a partial plan view of a modified electrode assembly embodying the present invention.
Figure 6:
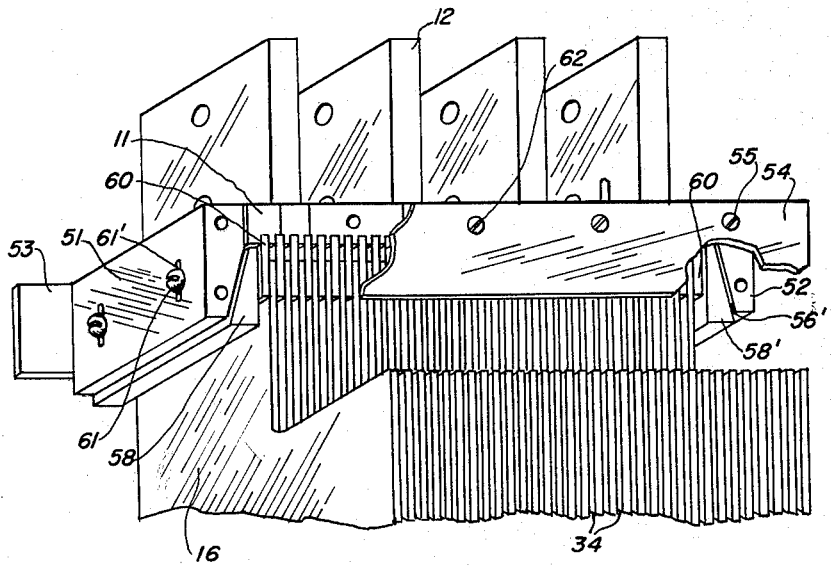
FIG. 6 is an isometric view of the embodiment of this invention shown in FIG. 5, portions of the terminal mounting being cut away to show the details of wedges used to retain its elements in assembled position.

In the modification of this invention illustrated in FIGS. 5 and 6 there is provided a frame 50′ comprising a pair of end members 51 and 52 and a pair of side members 53 and 54 secured together by bolts 55. A long bevel 56 and 56′ is cut in the inner face of each of the end members 51 and 52.

In preparing the terminal assembly, the terminal base 11 with its upwardly projecting pole pieces 12, its plate tabs 14 and its terminal tabs 16 are placed in frame 50′ so that the ends thereof are spaced slightly inwardly of the inner face of each member 51 and 52. Wedges 58 and 58′ are inserted between said end members 51 and 52, respectively, and the next-adjacent terminal tab and are forced into place from below. A shim 60 may be inserted between wedges 58 and 58′ and the next-adjacent terminal tab to insure at least a rough fit. The end members 51 and 52, wedges 58 and 58′, when driven into final clamping position, are secured to end members 51 and 52 by bolts 61 passing through slots 61′ and threadedly received by these wedges. Each member 53 and 54 is also secured to the terminal base 11 by means of bolts 62.

The superior performance of the instant invention with respect to minimizing voltage loss results in part from the fact that each plate tab is joined to two terminal tabs, thus providing a large area of contact for the flow of inter-cell equalizing currents with minimum loss of energy. The provision of cooling means at the point of maximum current concentration, i.e. at a common base forming a junction between a multiplicity of incoming branches (connecting tabs 14) and one or more outgoing branches (pole pieces 12), is likewise advantageous.

Numerous modifications and embodiments of this invention can be made without departing from the spirit and scope thereof, it being understood that the invention is not to be limited to specific details of the foregoing disclosure except as defined in the appended claims.

I claim:

1. In an electric battery cell, in combination, a housing of insulating material containing a set of electrode plates, said housing being provided with an internal shoulder near its top; a conductive elongated base member horizontally supported on said shoulder above said electrode plates; a set of dependent conductive tabs rigidly joined to the underside of said member, said tabs extending transversely to said member in staggered relationship with said electrode plates, the latter being provided with terminal lugs received between said tabs in conductive contact therewith; a plurality of conductive pole pieces of constant cross-section and with flat major faces parallel to said tabs rising from said member at longitudinally spaced locations; a cover for said housing above said member having openings loosely traversed by said pole pieces; and sealing means between said cover and said member for preventing fluid within said housing from reaching said openings.

2. The combination defined in claim 1 wherein said sealing means comprises a ring surrounding all said pole pieces with clearance.

3. The combination defined in claim 1 wherein said member is provided with a pair of downwardly projecting side plates, said member being freely supported on said shoulder by said side plates.

4. The combination defined in claim 3 wherein said side plates extend downwardly to substantially the lower ends of said tabs, further comprising clamping means between said side plates holding said tabs and lugs together under pressure.

5. The combination defined in claim 1 wherein said member is essentially composed of a plurality of alternately wider and narrower metallic sections provided with aligned bores together forming a channel for the passage of a cooling fluid, said pole pieces being integral with said narrower sections and forming therewith flat metallic bodies substantially of inverted-T shape lying in planes parallel to said plates.

References Cited by the Examiner

UNITED STATES PATENTS

| | | |
|---|---|---|
| 1,106,719 | 8/14 | Lake. |
| 1,705,021 | 3/29 | Lea. |
| 1,874,404 | 8/32 | Wood. |
| 2,855,453 | 10/58 | Eidensohn _____ 136—134 |

JOHN H. MACK, *Primary Examiner.*

JOHN R. SPECK, *Examiner.*